United States Patent
Li et al.

(10) Patent No.: US 9,353,698 B2
(45) Date of Patent: May 31, 2016

(54) METHOD FOR REGULATING A FUEL INJECTION SYSTEM OF AN INTERNAL COMBUSTION ENGINE

(75) Inventors: Hui Li, Regensburg (DE); Janos Kerekgyarto, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 744 days.

(21) Appl. No.: 13/805,827

(22) PCT Filed: Jun. 16, 2011

(86) PCT No.: PCT/EP2011/060024
§ 371 (c)(1),
(2), (4) Date: Dec. 20, 2012

(87) PCT Pub. No.: WO2011/161000
PCT Pub. Date: Dec. 29, 2011

(65) Prior Publication Data
US 2013/0103287 A1    Apr. 25, 2013

(30) Foreign Application Priority Data
Jun. 25, 2010    (DE) .......................... 10 2010 030 545

(51) Int. Cl.
*F02D 41/40*    (2006.01)
*F02D 41/34*    (2006.01)

(52) U.S. Cl.
CPC ............ *F02D 41/345* (2013.01); *F02D 41/401* (2013.01); *F02D 2200/0604* (2013.01);
(Continued)

(58) Field of Classification Search
CPC .......... F01D 41/401; F01D 2200/0602; F01D 2200/0604; F01D 2200/0618; F01D 2250/04; F01D 2041/2055
USPC .................................. 701/105; 123/478, 490
See application file for complete search history.

(56) References Cited

U.S. PATENT DOCUMENTS 5,402,760 A * 4/1995 Takeuchi ................ F02D 41/20
                                                                    123/300
6,102,009 A * 8/2000 Nishiyama .......... F02D 41/3827
                                                                    123/456

(Continued)

FOREIGN PATENT DOCUMENTS

DE    19733897 A1    2/1998
DE    19937148 A1    2/2001

(Continued)

OTHER PUBLICATIONS

German Office Action, Application No. 10 2010 030 545.6-26, 4 pages, Mar. 2, 2011.

(Continued)

*Primary Examiner* — Erick Solis
(74) *Attorney, Agent, or Firm* — Slayden Grubert Beard PLLC

(57) ABSTRACT

A method for regulating a fuel injection system of an internal combustion engine includes outputting from a control unit an instruction to start an injection process of fuel through an injection valve, wherein during a determination of a time of the outputting of the instruction to start the injection process, the control unit takes into account delays caused by the mechanical system of the injection valve. Furthermore, during the determination of the time of the outputting of the instruction to start the injection process, the control unit also takes into account a correction value which describes the fuel pressure in the injector feed line.

18 Claims, 2 Drawing Sheets

(52) U.S. Cl.
CPC . *F02D2200/0606* (2013.01); *F02D 2200/0616* (2013.01); *F02D 2200/0618* (2013.01); *F02D 2250/04* (2013.01); *Y02T 10/44* (2013.01)

(56) References Cited

U.S. PATENT DOCUMENTS

| | | | | |
|---|---|---|---|---|
| 6,276,337 | B1 | 8/2001 | Minato | 123/456 |
| 6,311,669 | B1 | 11/2001 | Przymusinski et al. | 123/300 |
| 6,732,715 | B2 * | 5/2004 | Fallahi | F02D 41/20 123/478 |
| 2002/0117152 | A1 * | 8/2002 | Fallahi | F02D 41/20 123/490 |
| 2013/0103287 | A1 | 4/2013 | Li et al. | 701/105 |

FOREIGN PATENT DOCUMENTS

| | | |
|---|---|---|
| DE | 10321999 A1 | 2/2004 |
| DE | 10302806 A1 | 8/2004 |
| DE | 69935826 T2 | 12/2007 |
| DE | 102008040325 A1 | 1/2010 |
| EP | 0969196 A2 | 1/2000 |
| EP | 1236880 A1 | 9/2002 |
| EP | 2031229 A2 | 3/2009 |
| WO | 99/47802 A1 | 9/1999 |
| WO | 2004/065775 A1 | 8/2004 ............. F02D 41/38 |
| WO | 2011/161000 A1 | 12/2011 |

OTHER PUBLICATIONS

International Search Report and Written Opinion, Application No. PCT/EP2011/060024, 15 pages, Oct. 26, 2011.

Chinese Office Action, Application No. 201180031492.5, 12 pages, Oct. 24, 2014.

Chinese Office Action, Application No. 201180031492.5, 12 pages, Jun. 8, 2015.

* cited by examiner

METHOD FOR REGULATING A FUEL INJECTION SYSTEM OF AN INTERNAL COMBUSTION ENGINE

CROSS-REFERENCE TO RELATED APPLICATIONS

This application is a U.S. National Stage Application of International Application No. PCT/EP2011/060024 filed Jun. 16, 2011, which designates the United States of America, and claims priority to DE Application No. 10 2010 030 545.6 filed Jun. 25, 2010, the contents of which are hereby incorporated by reference in their entirety.

TECHNICAL FIELD

The disclosure relates to a method for regulating a fuel injection system of an internal combustion engine.

BACKGROUND

Fuel injection systems of internal combustion engines have been known for many years. These fuel injection systems include common-rail injection systems in which fuel is placed at a high pressure by means of a high-pressure pump, fed into a high-pressure accumulator and passed on from there via injector feed lines to timed injectors, and injected into the cylinders of the internal combustion engine by means of these injectors.

In order to be able to comply with strict emission standards and to be able to operate the internal combustion engine at a high fuel efficiency, a fuel injection system must be capable of being able to inject a precisely metered fuel quantity in a precisely defined time period by means of a respective injector into a respectively associated cylinder of the internal combustion engine. For this purpose, a control unit is provided, said control unit outputting an instruction for starting an injection process.

It is already known to define the time of outputting of the starting instruction by taking into account delays which are caused by the mechanics of the injection valve. One of these delays is a hydraulic delay which is due to the fact that an injector requires time to move its needle into a position which permits fuel to be injected through the valve. In order to compensate such hydraulic delays which are caused by the mechanics of the injection valve, the fuel temperature, the fuel pressure prevailing in the high-pressure accumulator and the fuel quantity of the previous injection process or processors are measured using a hybrid test bench as an offline operation.

Data which corresponds to a respectively associated hydraulic delay are derived from the specified values. These data are stored in the software of the control unit and taken into account during the determination of the time of outputting of the instruction for starting the injection process during the operation of the internal combustion engine.

SUMMARY

In one embodiment, a method is provided for regulating a fuel injection system of an internal combustion engine, wherein an instruction for starting an injection process of fuel by an injection valve is output by means of a control unit, and wherein the control unit takes into account delays caused by the mechanics of the injection valve during the determination of the time for the outputting of the instruction for starting the injection process, wherein the control unit also takes into account a correction value in the determination of the time of the outputting of the instruction for starting the injection process, which correction value describes the fuel pressure in the injector feed line.

In a further embodiment, the correction value is determined by taking into account information about the fuel quantity of the preceding injection process. In a further embodiment, the correction value is determined by taking into account information about the time interval between successive instructions for starting an injection process. In a further embodiment, the correction value is determined by taking into account information about the fuel temperature.

In a further embodiment, the control unit is supplied with information about the fuel pressure in a high-pressure accumulator of the internal combustion engine, information about the fuel quantity of the preceding injection process, and information about the time interval between successive instructions for starting an injection process as input variables, and the control unit uses this information to actuate a three-dimensional characteristic diagram or a mathematical or physical model in which data corresponding to the amplitude behavior of the fuel pressure in the injector feed line is stored.

In a further embodiment, the information about the time interval between successive instructions for starting an injection process is supplied to a modulator or a one-dimensional characteristic diagram, and the output signal of the modulator or of the one-dimensional characteristic diagram is multiplied by the output signal of the three-dimensional characteristic diagram in a first product former.

In a further embodiment, information about the fuel temperature is supplied to the control unit, the information about the fuel temperature is converted into a temperature factor using a characteristic curve field, and the temperature factor is multiplied by the output signal of the first product former in a second product former in order to determine the correction value.

In a further embodiment, a plurality of preceding injection processes are taken into account during the determination of the correction value. In a further embodiment, the delays which occur during a plurality of preceding injection processes are added during the determination of the correction value.

BRIEF DESCRIPTION OF THE DRAWINGS

Exemplary embodiments will be explained in more detail below on the basis of the schematic drawings, wherein.

DETAILED DESCRIPTION

Some embodiments provide a method in which the determination of the time of the outputting of the instruction for starting the injection process is improved.

In some embodiments, during the determination of the time of the outputting of an instruction for starting an injection process, a correction value which describes the fuel pressure in the respective injector feed line is advantageously also taken into account. The influence of fuel pressure waves, occurring in the injector feed line during an injection process, on the hydraulic delay which is caused by the mechanics of the respective injection valve, is compensated by taking into account this correction value. This permits more precise adaptation of the time of the outputting of an instruction for starting an injection process to the pressure conditions which are actually present during the injection process, and therefore permits an improvement with respect to the compliance with high emission standards.

A possible advantage of some embodiments is that during production of injectors relatively large tolerance ranges can be allowed, which can reduce the costs of the production of injectors.

Figure 1:
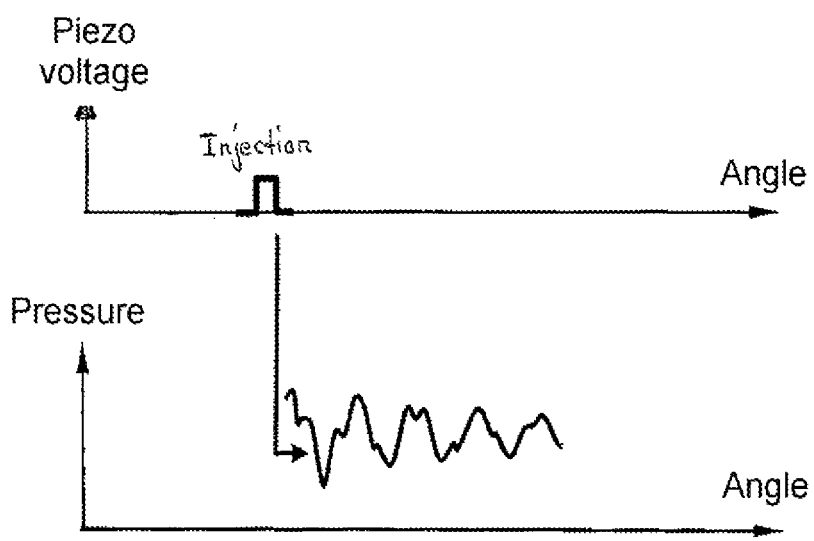
FIG. 1 shows diagrams explaining a pressure wave occurring in an injector feed line during an injection process.

FIG. 1 shows diagrams explaining a fuel pressure wave occurring in an injector feed line during an injection process. In this context, the upper diagram shows an electrical signal which is output by the control unit of the internal combustion engine, said signal corresponding to an instruction for starting an injection process. In reaction to this starting instruction and the injection which is triggered thereby, a fuel pressure wave occurs in the injector feed line of the actuated injector, said fuel pressure wave acting on the needle of the actuated injector valve and influencing the time at which the needle leaves its seat in the valve. This oscillating fuel pressure wave changes the hydraulic delay or the time at which the starting signal which is output by the control unit has actually opened the actuated valve. This hydraulic delay, which is caused by the mechanics of the injection valve, is compensated according to the present disclosure.

Figure 2:
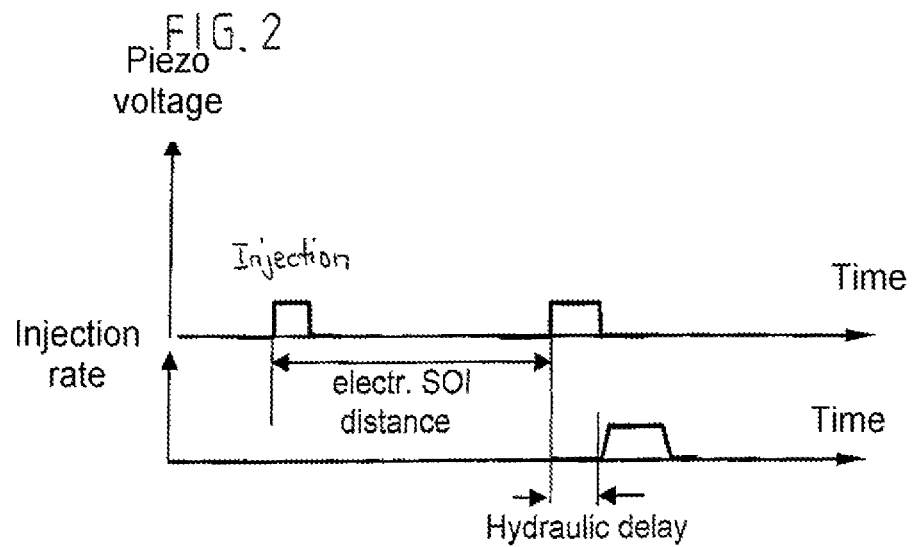
FIG. 2 shows diagrams explaining a hydraulic delay caused by the mechanics of an injection valve.

This hydraulic delay, which is caused by the mechanics of the injection valve, is illustrated in FIG. 2. Here, two instructions for starting an injection process, which are output by the control unit of the internal combustion engine, are illustrated in the upper illustration. The time interval between the rising edges of the two successive starting instructions is denoted by "electr. SOI Distance". From the lower illustration in FIG. 2 it is apparent that a delay which is denoted by "Hydraulic delay" is present between the rising edge of the second instruction for starting an injection process and the opening of the actuated injection valve. This hydraulic delay is compensated according to the present disclosure.

Figure 3:
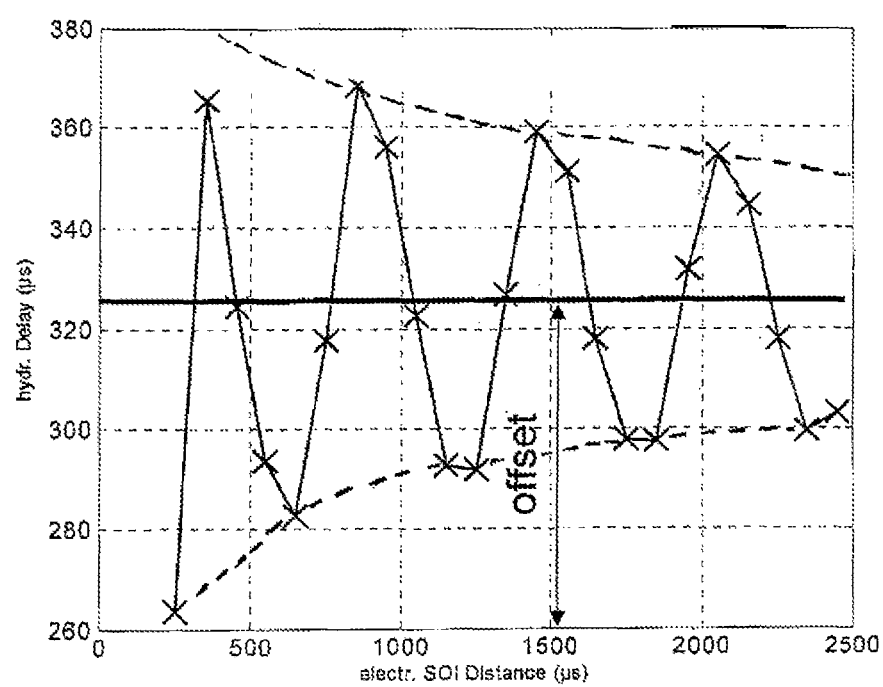
FIG. 3 shows a diagram in which the hydraulic delay is plotted as a function of the time interval between successive instructions for starting an injection process.

FIG. 3 shows a diagram in which the hydraulic delay is plotted as a function of the time interval between successive instructions for starting an injection process. In this context, the time interval between the rising edges of two successive instructions for starting an injection process is plotted in microseconds along the abscissa and is denoted by "electr. SOI Distance". Along the ordinate, the hydraulic delay is also plotted in microseconds and denoted by "hyd. Delay". This diagram was determined in the presence of a fuel pressure of 230 bar, with a fuel quantity $mf=5$ $mm^3$ being assigned to the first starting instruction, and a fuel quantity $mf=25$ $mm^3$ being assigned to the subsequent starting instruction.

The offset O illustrated in FIG. 3 corresponds to a hydraulic delay of approximately 325 μs. This value corresponds to the hydraulic delay which according to certain conventional systems is taken into account by the control unit during the determination of the time of the outputting of an instruction for starting an injection process. According to the some embodiments, during the determination of the time of the outputting of an instruction for starting an injection process, the control unit also takes into account, in addition to the specified offset O, a correction value which is dependent on the respectively desired time of the outputting of an instruction for starting an injection process and is derived from the curve in FIG. 3, which has an essentially sinusoidal profile. It is advantageous if this curve comprises at least two different frequency portions.

Figure 4:
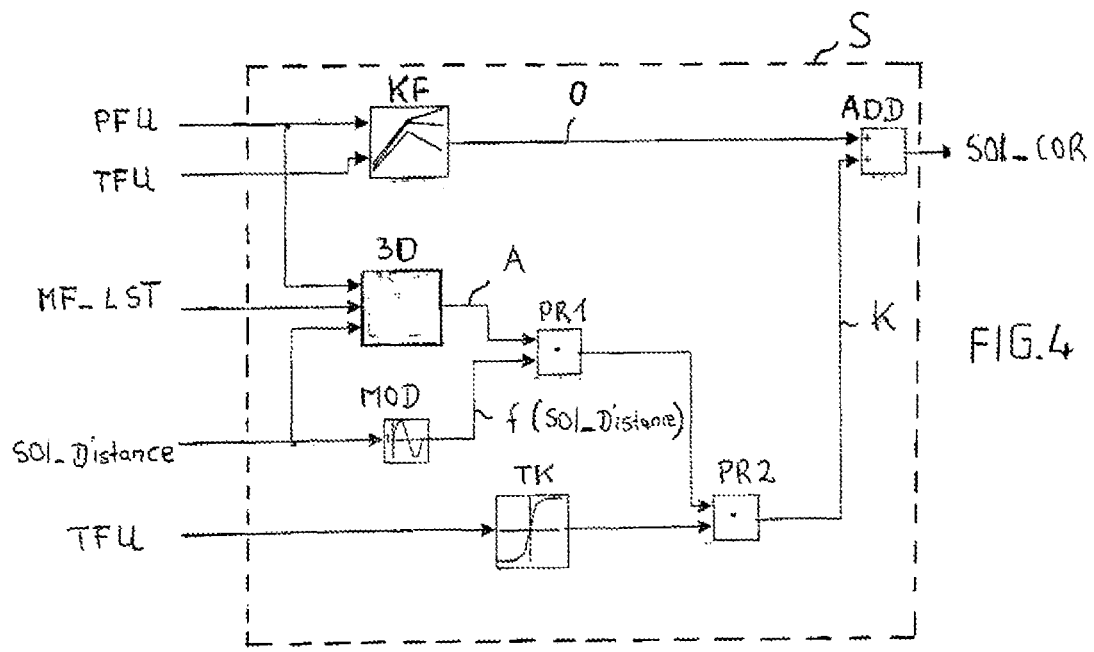
FIG. 4 shows a block diagram illustrating an exemplary embodiment of a control unit according to the disclosure.

FIG. 4 shows a block diagram illustrating an exemplary embodiment of a control unit S according to an example embodiment. This control unit S, which may be implemented by means of a microcomputer, is supplied with information PFU about the fuel pressure in the high-pressure accumulator of the internal combustion engine, information TFU about the fuel temperature, information MF_LST about the fuel quantity of the previous injection process and information SOI_Distance about the time interval between successive instructions for starting an injection process, as input signals. The control unit determines from these input signals a corrected offset signal which influences the time of the outputting of an instruction for starting an injection process, and makes available this offset signal provided with the designation SOI_COR in FIG. 4, to its output.

In order to determine the output signal SOI_COR, the control unit S adds, in an adder ADD, the offset O illustrated in FIG. 3 to a correction value K.

In this context, the control unit S determines the specified offset O by using the information PFU supplied to it about the fuel pressure and the information TFU supplied to it about the fuel temperature to actuate a characteristic diagram KF in which a multiplicity of offset values is stored, said offset values being assigned to a respectively associated combination of fuel pressure and fuel temperature.

The specified correction value K is determined as follows:

Firstly, the control unit actuates, by means of the information PFU supplied to it about the fuel pressure, information MF_LST about the fuel quantity of the previous injection process and information SOI_Distance about the time interval between successive instructions for starting an injection process, a three-dimensional characteristic diagram 3D in which data A(PFU,MF_LST, SOI_Distance) corresponding to the amplitude behavior of the fuel pressure in the injector feed line are stored. A corresponding mathematical or physical model can be used as an alternative to a three-dimensional characteristic diagram.

Furthermore, the information SOI_Distance about the time interval between successive instructions for starting an injection process is subjected to a sine modulation in a modulator MOD. The output signal A (PFU, MF_LST, SOI_Distance) is multiplied by the output signal f(SOI_Distance) or the output signal of a corresponding one-dimensional characteristic diagram in a first product former PR1.

Furthermore, the information TFU about the fuel temperature is converted into a temperature factor F using a characteristic curve field TK.

This temperature factor F is multiplied by the output signal of the first product former PR1 in a second product former PR2. At the output of the second product former PR2, the correction factor K is available, which correction factor K is added in the adder ADD to the offset O which is derived from the characteristic diagram KF in order to form the output signal SOI_COR of the control unit.

The output signal SOI_COR is taken into account during the determination of the time of the outputting of the instruction for starting the injection process. This determination of the time of the outputting of the instruction for starting the injection process is also advantageously carried out in the control unit S, which is not shown, however, in FIG. 4.

A plurality of preceding injection processes are advantageously taken into account during the determination of the correction value K. In this context, the delays which occur during the plurality of preceding injection processes can be added.

What is claimed is:

1. A method for regulating a fuel injection system of an internal combustion engine, comprising:
   a control unit outputting an instruction for starting an injection process of fuel by an injection valve,
   wherein the control unit determines a time for the outputting of the instruction for starting the injection process based at least on:
      delays caused by mechanics of the injection valve, and
      a correction value that indicates a fuel pressure in an injector feed line influenced by a fuel pressure wave in the injector feed line.

2. The method of claim 1, wherein the correction value is determined based at least on information regarding a fuel quantity of a preceding injection process.

3. The method of claim 1, wherein the correction value is determined based at least on information regarding a time interval between successive instructions for starting an injection process.

4. The method of claim 1, wherein the correction value is determined based at least on information regarding a fuel temperature.

5. The method of claim 1, wherein:
   the control unit is supplied with information regarding a fuel pressure in a high-pressure accumulator of the internal combustion engine, information regarding a fuel quantity of a preceding injection process, and information regarding a time interval between successive instructions for starting an injection process as input variables, and
   the control unit uses the supplied information to actuate a three-dimensional characteristic diagram or a mathematical or physical model including data corresponding to the amplitude behavior of the fuel pressure in the injector feed line.

6. The method of claim 5, wherein the information regarding the time interval between successive instructions for starting an injection process is supplied to a modulator or a one-dimensional characteristic diagram, and an output signal of the modulator or of the one-dimensional characteristic diagram is multiplied by the output signal of the three-dimensional characteristic diagram in a first product former.

7. The method of claim 6, wherein information regarding the fuel temperature is supplied to the control unit, the information regarding the fuel temperature is converted into a temperature factor using a characteristic curve field, and the temperature factor is multiplied by the output signal of the first product former in a second product former for determining the correction value.

8. The method of claim 1, wherein the correction value is determined based on a plurality of preceding injection processes.

9. The method of claim 8, wherein the correction value is determined based on a summed total of delays occurring during the plurality of preceding injection processes.

10. A system for regulating a fuel injection system of an internal combustion engine, comprising:
    a control unit comprising logic instructions stored in non-transitory computer readable media and executable to:
       output an instruction for starting an injection process of fuel by an injection valve, and
       determine a time for the outputting of the instruction for starting the injection process based at least on:
          delays caused by mechanics of the injection valve, and
          a correction value that indicates a fuel pressure in an injector feed line influenced by a fuel pressure wave in the injector feed line.

11. The system of in claim 10, wherein the control unit is programmed to determine the correction value based at least on information regarding a fuel quantity of a preceding injection process.

12. The system of claim 10, wherein the control unit is programmed to determine the correction value based at least on information regarding a time interval between successive instructions for starting an injection process.

13. The system of claim 10, the control unit is programmed to determine the correction value based at least on information regarding a fuel temperature.

14. The system of claim 10, wherein:
    the control unit is supplied with information regarding a fuel pressure in a high-pressure accumulator of the internal combustion engine, information regarding a fuel quantity of a preceding injection process, and information regarding a time interval between successive instructions for starting an injection process as input variables, and
    the control unit uses the supplied information to actuate a three-dimensional characteristic diagram or a mathematical or physical model including data corresponding to the amplitude behavior of the fuel pressure in the injector feed line.

15. The system of claim 14, comprising a modulator or a one-dimensional characteristic diagram configured to:
    receive the information regarding the time interval between successive instructions for starting an injection process, and
    multiple an output signal by the output signal of the three-dimensional characteristic diagram in a first product former.

16. The system of claim 15, wherein the control unit is configured to:
    receive information regarding the fuel temperature,
    convert the information regarding the fuel temperature into a temperature factor using a characteristic curve field, and
    multiply the temperature factor by the output signal of the first product former in a second product former for determining the correction value.

17. The system of claim 10, wherein the control unit is programmed to determine the correction value based on a plurality of preceding injection processes.

18. The system of claim 17, wherein the control unit is programmed to determine the correction value based on a summed total of delays occurring during the plurality of preceding injection processes.

* * * * *